US009780657B2

(12) United States Patent
Wang et al.

(10) Patent No.: US 9,780,657 B2
(45) Date of Patent: Oct. 3, 2017

(54) CIRCUITS AND METHODS FOR CONTROLLING A BOOST SWITCHING REGULATOR BASED ON INDUCTOR CURRENT

(71) Applicant: QUALCOMM Incorporated, San Diego, CA (US)

(72) Inventors: Yikai Wang, San Diego, CA (US); Joseph Rutkowski, Chandler, AZ (US); Jiwei Chen, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 14/805,209

(22) Filed: Jul. 21, 2015

(65) Prior Publication Data

US 2017/0025947 A1  Jan. 26, 2017

(51) Int. Cl.
| | | |
|---|---|---|
| G05F 1/56 | (2006.01) | |
| H02M 3/158 | (2006.01) | |
| G05F 1/618 | (2006.01) | |
| H02M 1/42 | (2007.01) | |
| H02M 3/156 | (2006.01) | |
| H02M 1/00 | (2006.01) | |

(52) U.S. Cl.
CPC ............ *H02M 3/158* (2013.01); *G05F 1/618* (2013.01); *H02M 1/4225* (2013.01); *H02M 3/156* (2013.01); *H02M 2001/0009* (2013.01)

(58) Field of Classification Search
CPC .............................. H02M 3/156; H02M 3/158
USPC .......................................... 323/271–282, 315
See application file for complete search history.

(56) References Cited

U.S. PATENT DOCUMENTS

| | | | | |
|---|---|---|---|---|
| 5,821,742 A | * | 10/1998 | Carr .................. | G01R 35/04 323/222 |
| 5,982,160 A | * | 11/1999 | Walters ................ | H02M 3/156 323/222 |
| 6,879,136 B1 | | 4/2005 | Erisman et al. | |
| 7,417,413 B2 | * | 8/2008 | Noma .................. | H02M 3/156 323/284 |
| 7,545,129 B2 | * | 6/2009 | Hane ..................... | H02M 3/158 323/282 |

(Continued)

OTHER PUBLICATIONS

Redl R., et al., "Ripple-Based Control of Switching Regulators—An Overview," IEEE Transactions on Power Electronics, Dec. 2009, vol. 24, No. 12, pp. 2669-2680.

(Continued)

*Primary Examiner* — Adolf Berhane
*Assistant Examiner* — Nusrat Quddus
(74) *Attorney, Agent, or Firm* — Haynes and Boone, LLP (57) ABSTRACT

The present disclosure pertains to circuits and methods for controlling a boost switching regulator based on inductor current. An input voltage is coupled to a first terminal of an inductor and the second terminal of the inductor is alternately coupled between a reference voltage and a boosted output voltage. The input voltage is further coupled to a first terminal of an integrator circuit, and a second terminal of the integrator circuit may be alternately coupled between the reference voltage and the boosted output voltage, for example, to produce a voltage corresponding to a current in the inductor. The present circuit may be used for voltage control or current control modes, or both, in a boost switching regulator.

19 Claims, 6 Drawing Sheets

(56) References Cited

U.S. PATENT DOCUMENTS

| | | | |
|---|---|---|---|
| 7,710,084 B1* | 5/2010 | Guo | G01R 19/003 323/224 |
| 8,159,205 B1* | 4/2012 | Latham, II | H02M 3/156 323/284 |
| 8,358,118 B2 | 1/2013 | Chen et al. | |
| 8,441,811 B2* | 5/2013 | Tang | H02M 1/4208 363/18 |
| 8,454,590 B2 | 6/2013 | Smith | |
| 8,513,934 B2 | 8/2013 | Hirose | |
| 8,823,352 B2 | 9/2014 | Zhang | |
| 2006/0145675 A1 | 7/2006 | Lee et al. | |
| 2010/0328971 A1 | 12/2010 | Rasko et al. | |
| 2011/0187332 A1* | 8/2011 | Salvestrini | H05B 37/0254 323/234 |
| 2014/0320104 A1 | 10/2014 | Guo | |

OTHER PUBLICATIONS

International Search Report—PCT/US2016/040400—ISA/EPO—Oct. 27, 2016.
Written Opinion—PCT/US2016/040400—ISA/EPO—Oct. 27, 2016.

* cited by examiner

CIRCUITS AND METHODS FOR CONTROLLING A BOOST SWITCHING REGULATOR BASED ON INDUCTOR CURRENT

BACKGROUND

The present disclosure relates to electronic circuits, systems and apparatuses, and in particular, to circuits and methods for controlling a boost switching regulator based on inductor current.

Switching regulators are a very efficient technique for providing and/or converting regulated voltages. Such regulators use one or more inductors and switches to store energy in magnetic fields generated as current flows through an inductor. Switches are used to selectively couple reference voltages to the inductor to either increase the energy in the inductor or allow the energy to flow to an output, for example. Accordingly, switching regulators are sometimes referred to as "switchers," "converters" (e.g., a Boost Converter or Buck Switcher).

Figure 1:
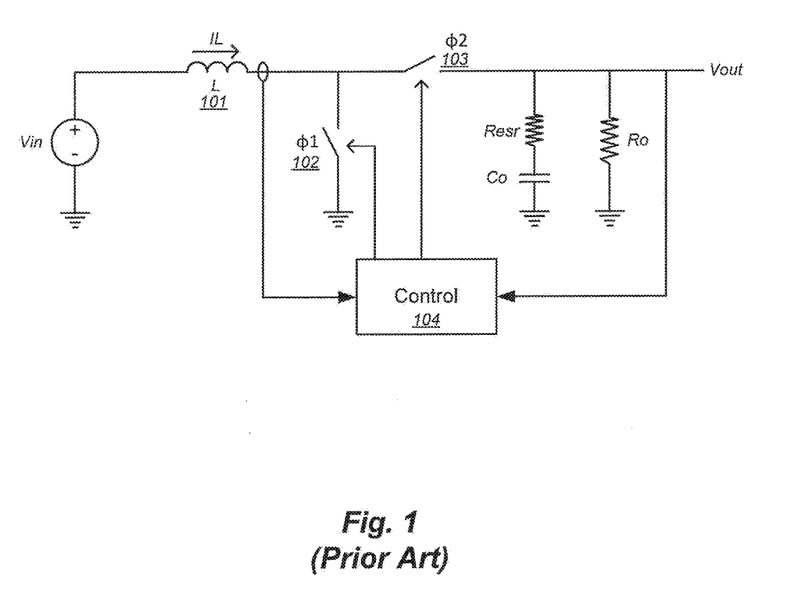
FIG. 1 illustrates a typical boost switching regulator.

FIG. 1 shows an example boost switching regulator. In a boost switching regulator, the input voltage is typically less than the output voltage. Buck regulators, on the other hand, have input voltages greater than the output voltages. A variety of switching regulators exist that store energy in inductors and transfer the energy using switches. In this example, a constant (or direct current, "DC") input voltage Vin is coupled to one terminal of an inductor L 101. The other terminal of the inductor 101 is coupled through a first switch 102 to a reference voltage (here, ground) and through a second switch 103 to an output terminal to produce a constant regulated output voltage Vout.

A boost switching regulator operates as follows. When switch 102 is closed (short circuited) and switch 103 is open (open circuited), the second terminal of inductor 101 is coupled to ground and a positive voltage Vout is applied across the terminals of inductor 101. Accordingly, during this first phase, denoted φ1, current in the inductor, IL, increases and energy is stored in the inductor. When switch 102 is opened and switch 103 is closed, the instantaneous inductor current remains unchanged, and such inductor current flows to the output terminal and into a load, which is represented here as a resistor Ro. During this second phase, denoted Φ2, the voltage across the inductor reverses polarity because Vout is larger than Vin in a boost converter. Accordingly, inductor current IL decreases during this phase of operation. Switches 102 and 103 may turn on and off over a particular time period, or cycle, to alternately charge and discharge the energy in the inductor. In some applications, the time switch 103 is on (closed) and switch 102 is off (open) may cause the inductor current IL flowing from inductor 101 through switch 103 to ramp down from a positive value to a lower positive value before the end of a switching cycle. In some applications the cycle and reverse voltage (Vout-Vin) may cause the inductor current IL and the current flowing through switch 103 to change polarity and go from positive (i.e., flowing to the output) to negative (flowing from the output to the input), such as in a forced continuous conduction mode (CCM) operation where the regulator may sink current, for example.

The regulated output voltage Vout is controlled by a feedback loop implemented using control circuitry 104. In this example, control circuit 104 senses the output voltage Vout and inductor current IL to regulate the output voltage Vout by controlling the time switches 102 and 103 are turned on and off during each cycle.

One problem associated with switching regulators pertains to controlling the system using current (referred to as current control) at very low duty cycles. For example, maintaining well-regulated current mode PWM control with very small duty cycles (e.g., 2%) can be very challenging. In some applications, forced CCM may be required to maintain a low ripple and negative current. Accordingly, as mentioned above, a boost switching regulator may have an inductor current that changes polarity during a switching cycle. Such changes in polarity cause problems for control circuits attempting to implement a current control scheme.

SUMMARY

The present disclosure pertains to circuits and methods for controlling a boost switching regulator based on inductor current. In one embodiment, the present disclosure includes a boost switching regulator circuit comprising an inductor having a first terminal configured to receive a first voltage and a second terminal, a first switch having a first terminal coupled to the second terminal of the inductor and a second terminal configured to receive a reference voltage, a second switch having a first terminal coupled to the second terminal of the inductor and a second terminal coupled to an output terminal of the boost switching regulator, a first capacitor having a first terminal coupled to the first terminal of the inductor and a second terminal, a first resistor having a first terminal coupled to the second terminal of the capacitor and a second terminal, a third switch having a first terminal coupled to the second terminal of the resistor and a second terminal configured to receive the reference voltage, and a fourth switch having a first terminal coupled to the second terminal of the resistor and a second terminal coupled to another reference voltage (e.g., the output terminal of the boost switching regulator).

In one embodiment, when the second terminal of the inductor is coupled to the reference voltage, the second terminal of the resistor is coupled to the output terminal of the boost switching regulator, and when the second terminal of the inductor is coupled to the output terminal of the boost switching regulator, the second terminal of the resistor is coupled to the reference voltage.

In one embodiment, when the first switch is closed, the second switch is opened, the third switch is opened, and the fourth switch is closed, and when the first switch is open, the second switch is closed, the third switch is closed, and the fourth switch is opened.

In one embodiment, the circuit further comprises a second capacitor having a first terminal coupled to the first terminal of the inductor and a second terminal and a second resistor having a first terminal coupled to the second terminal of the capacitor and a second terminal coupled to the second terminal of the inductor.

In one embodiment, the circuit further comprises a control circuit configured to receive a boosted output voltage on the output terminal of the boost switching regulator, a first sense voltage corresponding to an AC inductor current on the second terminal of the first capacitor, and a second sense voltage corresponding to a DC inductor current on the second terminal of the second capacitor.

In one embodiment, the circuit further comprises a voltage combiner circuit configured to receive a first sense voltage corresponding to an AC inductor current on the second terminal of the first capacitor and a second sense voltage corresponding to a DC inductor current on the second terminal of the second capacitor to produce a first ramp signal corresponding to the inductor current, a ramp generator circuit to generate a second ramp signal, and a ramp slope compensation circuit to compensate the second ramp signal based on the first ramp signal.

In one embodiment, the circuit further comprises a third capacitor configured to receive a first sense voltage corresponding to an AC inductor current on the second terminal of the first capacitor and produce a first current, a first voltage to current converter to receive a second sense voltage corresponding to a DC inductor current on the second terminal of the second capacitor to produce a second current, a fourth capacitor having a first terminal and a second terminal, a resistor network coupled to the second terminal of the fourth capacitor to add the first current and the second current to produce a first ramp signal corresponding to the inductor current, and a current source coupled to the first terminal of the fourth capacitor to produce a second ramp signal, wherein the first terminal of the fourth capacitor is coupled to an input of a comparator.

In one embodiment, the circuit further comprises a control circuit configured to receive a boosted output voltage on the output terminal of the boost switching regulator and a sense voltage corresponding to an AC inductor current on the second terminal of the first capacitor.

In one embodiment, the boost switching regulator is configured to use the boosted output voltage and the sense voltage corresponding to the AC inductor current in a voltage control mode.

In one embodiment, the reference voltage is ground.

In another embodiment, the present disclosure includes a method of generating a boosted regulated voltage comprising coupling an input voltage to a first terminal of an inductor, alternately coupling a second terminal of the inductor between a reference voltage and a boosted output voltage, coupling the input voltage to a first terminal of an integrator circuit, alternately coupled a second terminal of the integrator circuit between the reference voltage and the boosted output voltage to produce a voltage corresponding to a current in the inductor, wherein when the second terminal of the inductor is coupled to the reference voltage, the second terminal of the integrator circuit is coupled to another reference voltage (e.g., the output terminal of the boost switching regulator), and when the second terminal of the inductor is coupled to the boosted output voltage, the second terminal of the integrator circuit is coupled to the reference voltage.

In one embodiment, the method further comprises generating a plurality of switching signals to at least a first switch coupled between the second terminal of the inductor and said reference voltage, a second switch coupled between the second terminal of the inductor and an output terminal having said boosted output voltage, a third switch coupled between the second terminal of the integrator circuit and said reference voltage, and a fourth switch coupled between the second terminal of the integrator and the output terminal having the boosted output voltage, wherein when the first switch is closed, the second switch is opened, the third switch is opened, and the fourth switch is closed, and when the first switch is open, the second switch is closed, the third switch is closed, and the fourth switch is opened.

In one embodiment, the method further comprises coupling the input voltage to a first terminal of second capacitor, the second capacitor having a second terminal coupled to a first terminal of a second resistor, wherein the second resistor comprises a second terminal coupled to the second terminal of the inductor.

In one embodiment, the method further comprises combining, in a current control mode, a first sense voltage from the integrator circuit corresponding to an AC inductor current and a second sense voltage on the second terminal of the second capacitor corresponding to a DC inductor current.

In one embodiment, the method further comprises receiving, in control circuit operating in a voltage control mode, a first sense voltage from the integrator circuit corresponding to an AC inductor current and the boosted output voltage.

In one embodiment, the integrator circuit comprises a first capacitor having a first terminal coupled to the input voltage and a second terminal coupled to a first terminal of a first resistor, wherein the second terminal of the first resistor is said second terminal of the integrator circuit.

In another embodiment, the present disclosure includes a boost switching regulator circuit comprising an inductor having a first terminal configured to receive a first voltage and a second terminal, a first switch having a first terminal coupled to the second terminal of the inductor and a second terminal configured to receive a reference voltage, a second switch having a first terminal coupled to the second terminal of the inductor and a second terminal coupled to an output terminal of the boost switching regulator, and means for generating a voltage signal corresponding to an AC inductor current.

In one embodiment, means for generating a voltage signal corresponding to the AC inductor current comprising a third switch having a first terminal coupled to a switching node and a second terminal configured to receive a reference voltage, a fourth switch having a first terminal coupled to the switching node and a second terminal coupled to the output terminal of the boost switching regulator, and means for integrating the voltage on the switching node to produce the voltage signal corresponding to the AC inductor current.

In one embodiment, when the first switch is closed, the second switch is opened, the third switch is opened, and the fourth switch is closed, and when the first switch is open, the second switch is closed, the third switch is closed, and the fourth switch is opened.

In one embodiment, the circuit further comprises means for generating a voltage signal corresponding to a DC inductor current and means for combining the voltage signal corresponding to the AC inductor current and the voltage signal corresponding to the DC inductor current to compensate a ramp signal in a current control mode.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 2:
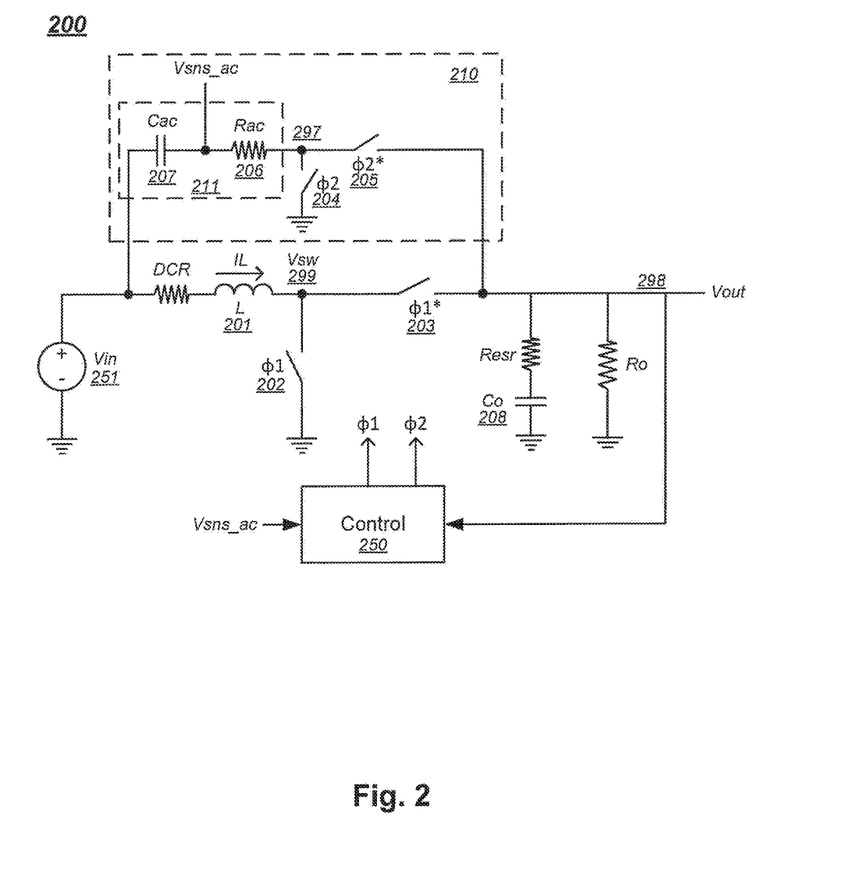
FIG. 2 illustrates an example switching regulator according to an embodiment.

FIG. 2 illustrates an example boost switching regulator circuit according to an embodiment. In this example, a boost switching regulator circuit 200 includes an inductor 201, switch 202, switch 203, control circuit 250, and a current sense circuit 210. Inductor 201 has a first terminal configured to receive a first voltage (here, input voltage Vin from voltage source 251) and a second terminal. In this example, a resistance DCR corresponds to a parasitic resistance in the inductor, for example. Switch 202 has a first terminal coupled to the second terminal of inductor 201 at switching node 299 having a switching voltage Vsw and a second terminal coupled to a reference voltage, which in this example is ground (e.g., 0 volts). A second switch 203 has a first terminal coupled to the second terminal of inductor 201 at switching node 299 and a second terminal coupled to an output terminal 298 of the boost switching regulator, which in this case has a boost output voltage Vout. For a boost switching regulator, Vout is nominally greater than Vin, although Vin may be greater than Vin for periods of time in some applications. For example, Vin may be supplied by a battery (e.g., in a mobile device), wherein Vin may be greater than Vout if the battery is overcharged or fully charged, for example. The output terminal 298 may be coupled to a capacitor (Co) 208 having a parasitic resistance Resr, for example, and a load may be modeled as a resistor Ro.

Features and advantages of the present disclosure include a circuit for generating a voltage signal corresponding to the alternating current (AC) inductor current. During operation of the boost switching regulator, switches 202 and 203 alternately couple a terminal of inductor 201 at the switching node 299 to the reference voltage (typically ground) and the boosted output voltage, Vout. The other terminal of the inductor 201 is maintained at Vin. Accordingly, when Vsw is ground, the inductor current IL increases, and when Vsw is Vout, the inductor current IL decreases. Generally, current in an inductor is related to the integral of the voltage applied across the inductor terminals. Accordingly, since the voltage input applied to the inductor at Vsw is a square wave transitioning between ground and Vout, the inductor current is a substantially a triangle wave (the integral of a square wave).

Embodiments of the present disclosure generate a voltage signal corresponding to the AC inductor current by coupling the voltages across the inductor, Vin and Vout, to an integrator circuit 211. In this example, switches 204 and 205 and a resistor/capacitor (RC) integrator circuit illustrate one mechanism for generating a voltage signal corresponding to the AC inductor current. Capacitor 207 is coupled to a terminal of inductor 201 to receive Vin. A second terminal of capacitor 207 is coupled to a terminal of resistor 206. A second terminal of resistor 206 is coupled to a second switching node 297. Resistor 206 and capacitor 207 illustrate one example integrator circuit for integrating a voltage on the switching node 297 to produce the voltage signal corresponding to the AC inductor current. Switch 204 has a first terminal coupled to the second terminal of resistor 206 at the switching node 297 and a second terminal coupled to the reference voltage (e.g., ground). In this example, switch 205 has a first terminal coupled to the second terminal of resistor 206 and a second terminal coupled to the output terminal of the boost switching regulator to receive the boosted output voltage Vout. In other embodiments, the second terminal of switch 205 may be coupled to another reference voltage other than Vout such that the circuit produces a voltage signal corresponding to the AC current in the inductor, for example.

During operation, the input voltage Vin is coupled to a first terminal of inductor 201. The second terminal of inductor 201 is alternately coupled between the reference voltage (e.g., ground) and the boosted output voltage, Vout, by switches 202 and 203. Accordingly, a square wave transitioning between ground and Vout may be applied to the inductor. Similarly, the input voltage Vin is applied to a first terminal of capacitor 207 and the second terminal of resistor 206 is alternately coupled between the reference voltage and the boosted output voltage by switches 204 and 205. Since an RC circuit operates as an integrator, the result is to produce a voltage, Vsns_ac, on the second terminal of capacitor 207 corresponding to a current in the inductor.

Switches 202-205 may operate so that when the second terminal of inductor 201 at switching node 299 is coupled to the reference voltage, the second terminal of resistor 206 at switching node 297 is coupled to the boosted output voltage Vout. Conversely, when the second terminal of inductor 201 is coupled to the boosted output voltage Vout, the second terminal of resistor 206 at switching node 297 is coupled to the reference voltage. For example, during a first phase, when switch 202 is closed, switch 203 is opened, switch 204 is opened, and switch 205 is closed. During a second phase, when switch 202 is open, switch 203 is closed, switch 204 is closed, and switch 205 is opened.

Switching circuit 200 further includes a control circuit 250 to control switch 202 and switch 203 based on the boosted output voltage, Vout, and the voltage signal corresponding to the inductor current, Vsns_ac. In one embodiment, the boosted output voltage Vout and Vsns_ac may be used in a voltage control mode, where Vout and Vsns_ac are used to maintain Vout at a particular voltage level. In another embodiment, Vout, Vsns_ac, and a voltage corresponding to a DC inductor current are further used in a current control mode. Voltage control typically operates over many cycles at a slower speed, whereas current control typically operates over each cycle at a higher speed. In this illustrative example, Vsns_ac and Vout are used to generate switch control signals φ1 and φ2 and their corresponding inverses φ1* and φ2* to turn switches 202-205 on (closed) and off (open) as described above. As illustrated in an example below, φ/φ1* may be 180 degree phase shifted to produce φ2/φ2*, for example.

Figure 3:
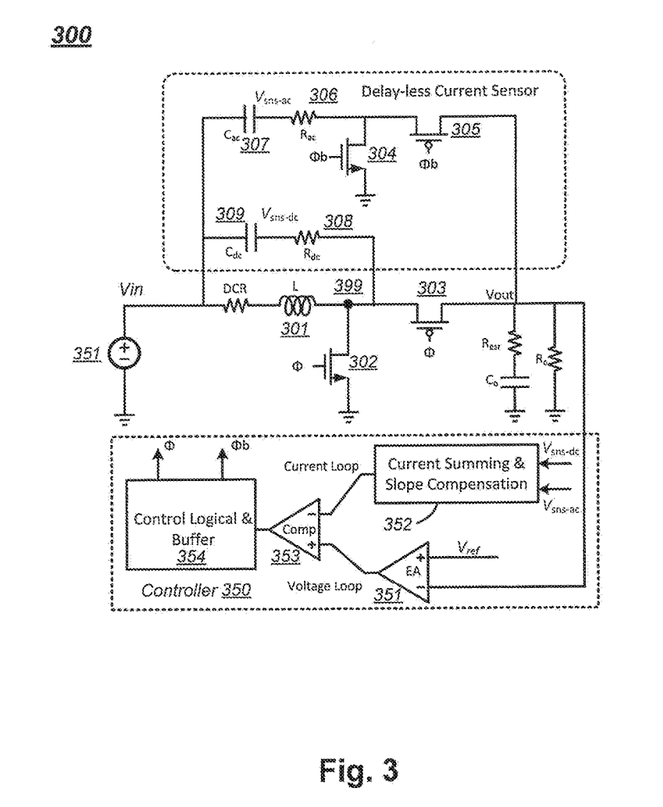
FIG. 3 illustrates an example switching regulator according to another embodiment.
Figure 4:
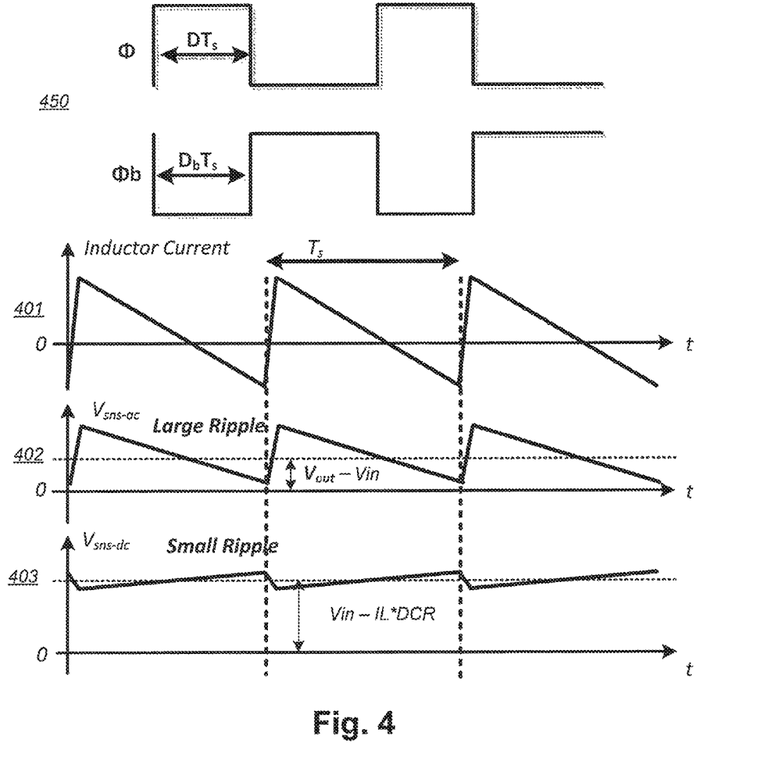
FIG. 4 illustrates waveforms for the circuit of FIG. 3.

FIG. 3 illustrates an example switching regulator according to another embodiment. In this example, boost switching regulator circuit 300 includes inductor having a first terminal coupled to input voltage source 351 (Vin) and a second terminal coupled to ground through switch 302 and to a boost circuit output terminal (Vout) through switch 303. Further an inductor current sense circuit includes resistor 306, capacitor 307, and switches 304 and 305 to generate a voltage signal Vsns_ac corresponding to the AC inductor current. These circuit elements operate substantially as described with regard to the circuit in FIG. 2 above. In this example, switches are implemented using MOS transistors, wherein switch 302 is a PMOS switch transistor, switch 303 is a PMOS switch transistor, switch 304 is an NMOS switch transistor, and switch 306 is a PMOS switch transistor. FIG. 4 illustrates waveforms for the circuit of FIG. 3. In this example, switches 302 and 303 are driven by a signal φ and switches 304 and 305 are driven by a signal φb, both of which are generated by control logic and buffers 354 in controller 350, for example. As mentioned above, advantageously, signal φb is 180 degrees out of phase with signal φ, such that signal φb may be the inverse of signal φ, for example.

The present example may include both voltage control and current control. For example, voltage control may be implemented by coupling the boosted output voltage, Vout, to one input of an error amplifier 351, and receiving a reference voltage, Vref, in a second input of the error amplifier 351. The output of error amplifier 351 is a voltage loop error signal, which is coupled to comparator 353. As mentioned above, in some applications a voltage loop may also incorporate Vsns_ac, the voltage corresponding to the AC inductor current. However, in this example, voltages corresponding to AC and DC components of the inductor current are coupled to current summing & slope compensation circuit 352 to incorporate AC and DC inductor current into a ramp signal of a current control loop. A compensated ramp signal is coupled to a second input of the comparator 353. An output of the comparator is received by control logic and buffer 354 and used to generate switching signals φ and φb.

Features and advantages of the present example illustrated in FIG. 3 include generating voltages corresponding to the AC and DC components of the inductor current. For example, in addition to the AC inductor current component produced using an integrator (e.g., an RC circuit) as described above, a voltage corresponding to a DC component of the inductor current may be generated using resistor 308 and capacitor 309. For example, boost switching regulator circuit 300 includes a second capacitor (Cdc) 309 having a first terminal coupled to the first terminal of inductor 301 and a second terminal coupled to a first terminal of a second resistor 308. Resistor 308 includes a second terminal coupled to the second terminal of inductor 301 at the switching node. FIG. 4 illustrates the waveforms for the circuit of FIG. 3. At 450, FIG. 4 illustrates the signal φ and signal φb are 180 degrees out of phase (here signal φb is the inverse of signal φ). Inductor current is shown at 401. A voltage waveform corresponding to the AC component of the inductor current is shown at 402. Finally, a voltage waveform corresponding to the DC component of the inductor current is shown at 403. As shown in FIG. 4, the DC component of the inductor current has a small ripple, but the average value is a function of the inductor current IL, referenced to Vin (e.g., Vsns_dc=Vin−(IL*DCR)). The AC component has a larger ripple, and is in phase with, and represents, the AC component of the inductor current over each cycle of period Ts, for example. Control circuit 350 may be configured to receive the boosted output voltage Vout on the output terminal, the first sense voltage, Vsns_ac, corresponding to an AC inductor current on the second terminal of capacitor 307, and a second sense voltage, Vsns_dc, corresponding to a DC inductor current on the second terminal of the second capacitor 309, and in accordance therewith, implement a current control mode of operation.

Figure 5A:
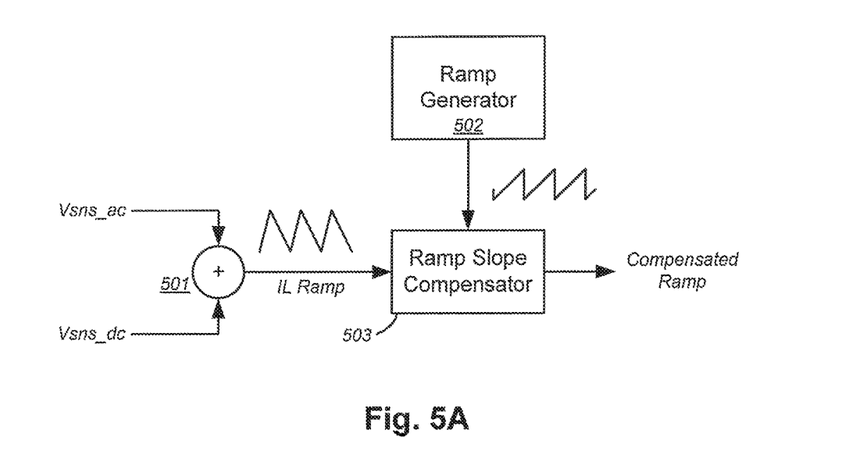
FIG. 5A illustrates combining voltages corresponding to AC and DC inductor current components for ramp compensation in a current control mode according to an embodiment.

FIG. 5A illustrates combining voltages corresponding to AC and DC inductor current components for ramp compensation in a current control mode according to an embodiment. Here, Vsns_ac and Vsns_dc are coupled to a voltage combiner circuit 501 (e.g., an adder) to produce an IL ramp signal corresponding to the increasing and decreasing inductor current on each cycle. A second ramp signal is generated by ramp generator circuit 502, and the two ramps are combined in ramp slope compensation circuit 503 to compensate the second ramp using information from the IL ramp, for example.

Figure 5B:
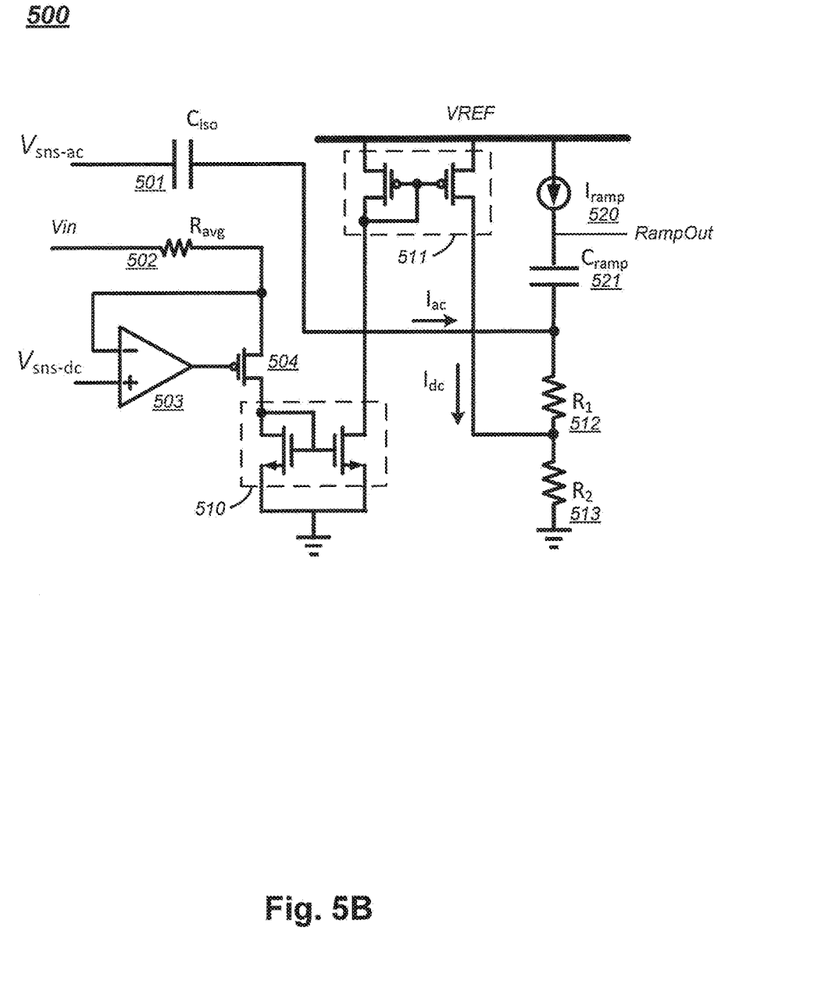
FIG. 5B illustrates an example implementation of ramp compensation according to another embodiment.

FIG. 5B illustrates an example implementation of ramp compensation according to another embodiment. While it is to be understood that the voltages Vsns_ac and Vsns_dc, corresponding to the AC and DC components of the inductor current, could be combined and otherwise used to compensate a ramp signal, the following illustrates one particular example circuit for doing so and is not to be construed as limiting the claims of the application. In this example, Vsns_ac is coupled through capacitor 501 (Ciso) to produce a current, Iac, corresponding to the AC inductor current. Vsns_dc is also converted to a current using a voltage to current converter circuit. As mentioned above, in some embodiments, Vsns_dc may be referenced to Vin. Thus, the present example couples Vsns_dc to one terminal of a resistor 502 (Ravg). The other terminal of resistor 502 is coupled to Vin such that the current through the resistor, Idc, is as follows:

$$Idc=1/Ravg*(Vin-Vsns\_dc)=1/Ravg*(Vin-[Vin-(IL*DCR)])$$

$$Idc=IL*DCR/Ravg$$

Thus, resistor 502 may be used to scale down the DC component of the inductor current IL and is one example mechanism for converting Vsns_dc to a current corresponding to the DC inductor current. In this example, a unity gain circuit comprising amplifier 503 and PMOS transistor 504 is used to set a voltage Vsns_dc on one terminal of resistor 502, for example.

In this example, currents Iac and Idc are added in a resistor network to produce a first ramp signal corresponding to the inductor current. Currents Iac and Idc may be combined proportionally such that the scale of each current, when combined, reconstructs an accurate representation of the inductor current, for example. In this example, the resistor network comprises series configured resistors 512 and 513. Iac is coupled to a first terminal of resistor 512 from a terminal of capacitor 501. Idc is coupled through an NMOS current mirror 510 and PMOS current mirror 511 to a second terminal of resistor 512 and a first terminal of resistor 513, for example. Values of resistors 512 and 513 may be set to recombine the currents to produce a ramp signal corresponding to the inductor current on a terminal of capacitor 521 (Cramp).

A voltage ramp signal may be produced using current source 520 (Iramp) coupled to capacitor 521. Thus, one terminal of capacitor 521 receives current Iramp to produce the ramp signal, and the ramp signal is compensated by the second ramp signal corresponding to the inductor current on the other terminal of capacitor 521. Thus, in this example, the terminal of capacitor 521 coupled to Iramp may be coupled to a comparator to provide a ramp signal compensated for inductor current (e.g., as per control circuit 350 in FIG. 3), and thereby implementing one example of current control mode, for example.

Figure 6:
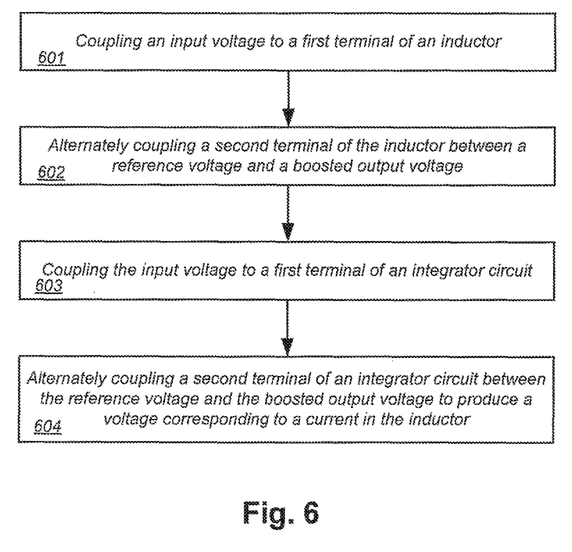
FIG. 6 illustrates method according to an embodiment.

FIG. 6 illustrates method for boosting a voltage according to an embodiment. According to this example technique, an input voltage is coupled to a first terminal of an inductor at 601. At 602, a second terminal of the inductor is alternately coupled between a reference voltage and a boosted output voltage. The reference voltage and boosted output voltage may be coupled to the second terminal of the by alternately activated switches, such as MOS transistors, for example. At 603, the input voltage is coupled to a first terminal of an integrator circuit. One example integrator circuit is an RC circuit illustrated above, which is a passive integrator circuit, for example. At 604, a second terminal of the integrator circuit is alternately coupled between the reference voltage and the boosted output voltage to produce a voltage corresponding to a current in the inductor. When the second terminal of the inductor is coupled to the reference voltage, the second terminal of the integrator circuit is coupled to the boosted output voltage, and when the second terminal of the inductor is coupled to the boosted output voltage, the second terminal of the integrator circuit is coupled to the reference voltage. Accordingly, in one embodiment, the integrator circuit may produce a voltage corresponding to an AC current in the inductor.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A boost switching regulator circuit comprising:
   an inductor having a first terminal configured to receive a first voltage and a second terminal;
   a first switch having a first terminal coupled to the second terminal of the inductor and a second terminal configured to receive a first reference voltage;
   a second switch having a first terminal coupled to the second terminal of the inductor and a second terminal coupled to an output terminal of the boost switching regulator;
   a first capacitor having a first terminal coupled to the first terminal of the inductor and a second terminal;
   a first resistor having a first terminal coupled to the second terminal of the first capacitor and a second terminal;
   a third switch having a first terminal coupled to the second terminal of the first resistor and a second terminal configured to receive the first reference voltage; and
   a fourth switch having a first terminal coupled to the second terminal of the first resistor and a second terminal coupled to a second reference voltage.

2. The circuit of claim 1 wherein the second reference voltage is an output voltage on the output terminal of the boost switching regulator.

3. The circuit of claim 2 wherein when the second terminal of the inductor is coupled to the first reference voltage, the second terminal of the first resistor is coupled to the output terminal of the boost switching regulator, and when the second terminal of the inductor is coupled to the output terminal of the boost switching regulator, the second terminal of the first resistor is coupled to the first reference voltage.

4. The circuit of claim 2 wherein when the first switch is closed, the second switch is opened, the third switch is opened, and the fourth switch is closed, and when the first switch is open, the second switch is closed, the third switch is closed, and the fourth switch is opened.

5. The circuit of claim 2 further comprising:
   a second capacitor having a first terminal coupled to the first terminal of the inductor and a second terminal; and
   a second resistor having a first terminal coupled to the second terminal of the second capacitor and a second terminal coupled to the second terminal of the inductor.

6. The circuit of claim 5 further comprising a control circuit configured to receive a boosted output voltage on the output terminal of the boost switching regulator, a first sense voltage corresponding to an AC inductor current on the second terminal of the first capacitor, and a second sense voltage corresponding to a DC inductor current on the second terminal of the second capacitor.

7. The circuit of claim 5 further comprising;
   a voltage combiner circuit configured to receive a first sense voltage corresponding to an AC inductor current on the second terminal of the first capacitor and a second sense voltage corresponding to a DC inductor current on the second terminal of the second capacitor to produce a first ramp signal corresponding to a current through the inductor;
   a ramp generator circuit to generate a second ramp signal; and
   a ramp slope compensation circuit to compensate the second ramp signal based on the first ramp signal.

8. The circuit of claim 5 further comprising:
   a third capacitor configured to receive a first sense voltage corresponding to an AC inductor current on the second terminal of the first capacitor and produce a first current;
   a first voltage to current converter to receive a second sense voltage corresponding to a DC inductor current on the second terminal of the second capacitor to produce a second current;
   a fourth capacitor having a first terminal and a second terminal;
   a resistor network coupled to the second terminal of the fourth capacitor to add the first current and the second current to produce a first ramp signal corresponding to a current through the inductor; and
   a current source coupled to the first terminal of the fourth capacitor to produce a second ramp signal, wherein the first terminal of the fourth capacitor is coupled to an input of a comparator.

9. The circuit of claim 2 further comprising a control circuit configured to receive a boosted output voltage on the output terminal of the boost switching regulator and a sense voltage corresponding to an AC inductor current on the second terminal of the first capacitor.

10. The circuit of claim 9 wherein the boost switching regulator is configured to use the boosted output voltage and the sense voltage corresponding to the AC inductor current in a voltage control mode.

11. A method of generating a boosted regulated voltage comprising:
    coupling an input voltage to a first terminal of an inductor;
    alternately coupling a second terminal of the inductor between a first reference voltage and a boosted output voltage;
    coupling the input voltage to a first terminal of an integrator circuit;
    alternately coupling a second terminal of the integrator circuit between the first reference voltage and a second reference voltage to produce a voltage corresponding to a current in the inductor,
    wherein when the second terminal of the inductor is coupled to the first reference voltage, the second terminal of the integrator circuit is coupled to the second reference voltage, and when the second terminal of the inductor is coupled to the boosted output voltage, the second terminal of the integrator circuit is coupled to the second reference voltage.

12. The method of claim 11 wherein the second reference voltage is the boosted output voltage.

13. The method of claim 11 further comprising generating a plurality of switching signals to at least a first switch coupled between the second terminal of the inductor and the first reference voltage, a second switch coupled between the second terminal of the inductor and an output terminal having the boosted output voltage, a third switch coupled between the second terminal of the integrator circuit and the first reference voltage, and a fourth switch coupled between the second terminal of the integrator circuit and the second reference voltage, wherein when the first switch is closed, the second switch is opened, the third switch is opened, and the fourth switch is closed, and when the first switch is open, the second switch is closed, the third switch is closed, and the fourth switch is opened.

14. The method of claim 11 further comprising coupling the input voltage to a first terminal of a second capacitor, the second capacitor having a second terminal coupled to a first terminal of a second resistor, wherein the second resistor comprises a second terminal coupled to the second terminal of the inductor.

15. The method of claim 14 further comprising combining, in a current control mode, a first sense voltage from the integrator circuit corresponding to an AC inductor current and a second sense voltage on the second terminal of the second capacitor corresponding to a DC inductor current.

16. The method of claim 11 further comprising receiving, in a control circuit operating in a voltage control mode, a first sense voltage from the integrator circuit corresponding to an AC inductor current and the boosted output voltage.

17. The method of claim 11 wherein the integrator circuit comprises a first capacitor having a first terminal coupled to the input voltage and a second terminal coupled to a first terminal of a first resistor, wherein the second terminal of the first resistor is said second terminal of the integrator circuit.

18. A boost switching regulator circuit comprising:
an inductor having a first terminal configured to receive a first voltage and a second terminal;
a first switch having a first terminal coupled to the second terminal of the inductor and a second terminal configured to receive a reference voltage;
a second switch having a first terminal coupled to the second terminal of the inductor and a second terminal coupled to an output terminal of the boost switching regulator; and
a third switch having a first terminal coupled to a switching node and a second terminal configured to receive a reference voltage;
a fourth switch having a first terminal coupled to the switching node and a second terminal coupled to the output terminal of the boost switching regulator; and
means for integrating a voltage on the switching node to produce a voltage signal corresponding to an AC inductor current.

19. The circuit of claim 18 wherein when the first switch is closed, the second switch is opened, the third switch is opened, and the fourth switch is closed, and when the first switch is open, the second switch is closed, the third switch is closed, and the fourth switch is opened, the circuit further comprising means for generating a voltage signal corresponding to a DC inductor current and means for combining the voltage signal corresponding to the AC inductor current and the voltage signal corresponding to the DC inductor current to compensate a ramp signal in a current control mode.

* * * * *